US008619331B2

(12) United States Patent
Qiao et al.

(10) Patent No.: US 8,619,331 B2
(45) Date of Patent: Dec. 31, 2013

(54) SIMULATED PAPER TEXTURE USING CLEAR TONER AND GLOSSMARK ON TEXTURE-LESS STOCK

(75) Inventors: Mu Qiao, Castro Valley, CA (US); Marc Rene, Rochester, NY (US); William A. Fuss, Rochester, NY (US); Shen-ge Wang, Fairport, NY (US); Paul Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/185,565

(22) Filed: Jul. 19, 2011

(65) Prior Publication Data

US 2013/0022753 A1 Jan. 24, 2013

(51) Int. Cl.
*G06K 15/00* (2006.01)

(52) U.S. Cl.
USPC ......... 358/3.06; 358/3.08; 358/3.09; 358/3.1; 382/212

(58) Field of Classification Search
None
See application file for complete search history.

(56) References Cited

U.S. PATENT DOCUMENTS

| | | | | |
|---|---|---|---|---|
| 4,210,346 | A | 7/1980 | Mowry, Jr. et al. | |
| 5,234,783 | A | 8/1993 | Ng | |
| 5,695,220 | A | 12/1997 | Phillips | |
| 5,734,752 | A | 3/1998 | Knox | |
| 6,108,512 | A | 8/2000 | Hanna | |
| 7,092,128 | B2 | 8/2006 | Wang et al. | |
| 7,126,721 | B2 | 10/2006 | Wang | |
| 7,148,999 | B2 | 12/2006 | Xu et al. | |
| 7,180,635 | B2 * | 2/2007 | Wang et al. | 358/3.06 |
| 7,193,751 | B2 | 3/2007 | Wang et al. | |
| 7,295,341 | B2 | 11/2007 | Nagarajan et al. | |
| 7,301,675 | B2 | 11/2007 | Wang et al. | |
| 7,304,770 | B2 | 12/2007 | Wang et al. | |
| 7,324,241 | B2 | 1/2008 | Eschbach et al. | |
| 7,352,493 | B2 | 4/2008 | Liu et al. | |
| 7,382,495 | B2 | 6/2008 | Liu et al. | |
| 7,391,537 | B2 | 6/2008 | Eschbach et al. | |
| 7,397,565 | B2 * | 7/2008 | Nakaya et al. | 356/446 |
| 7,468,820 | B2 | 12/2008 | Ng et al. | |
| 7,589,865 | B2 | 9/2009 | Eschbach et al. | |
| 7,656,556 | B2 | 2/2010 | Wang | |
| 7,813,006 | B2 | 10/2010 | Liu et al. | |
| 8,248,661 | B2 * | 8/2012 | Wang et al. | 358/3.06 |
| 8,447,204 | B2 * | 5/2013 | Qiao et al. | 399/82 |
| 2004/0218782 | A1 * | 11/2004 | Brunk | 382/100 |

(Continued)

FOREIGN PATENT DOCUMENTS

WO 2006091366 A1 8/2006

OTHER PUBLICATIONS

U.S. Appl. No. 12/968,843, filed Dec. 15, 2010 titled "System to Enable Development of Clear Toner Forms", by David C. Robinson et al.

(Continued)

*Primary Examiner* — Benny Q Tieu
*Assistant Examiner* — Michael Y Tzeng
(74) *Attorney, Agent, or Firm* — Fay Sharpe LLP

(57) ABSTRACT

A method includes receiving a primary image as input data and receiving textured image data for rendering a perceived non-uniform texture on a printed output of the primary image. The primary image input data is used for determining a low coverage portion and a high coverage portion. The method then includes applying clear toner to the low coverage portion and applying colored toner at variable anisotropic orientations to the high coverage portion.

19 Claims, 7 Drawing Sheets

(56) References Cited

U.S. PATENT DOCUMENTS

| | | | | |
|---|---|---|---|---|
| 2007/0177759 | A1 | 8/2007 | Eschbach et al. | |
| 2007/0262579 | A1 | 11/2007 | Bala et al. | |
| 2007/0264476 | A1 | 11/2007 | Bala et al. | |
| 2008/0079971 | A1 * | 4/2008 | Liu et al. | 358/1.9 |
| 2008/0192297 | A1 * | 8/2008 | Wang et al. | 358/3.06 |
| 2008/0193860 | A1 | 8/2008 | Hains | |
| 2010/0128321 | A1 | 5/2010 | Wang | |
| 2010/0195160 | A1 | 8/2010 | Schulze-Hagenest | |
| 2010/0232821 | A1 * | 9/2010 | Zaretsky et al. | 399/67 |

OTHER PUBLICATIONS

U.S. Appl. No. 12/913,226, filed Oct. 27, 2010, titled "Simulated Paper Texture Using Clear Toner on Uniform Substrate", by Mu Qiau et al.

U.S. Appl. No. 13/031,646, filed Feb. 22, 2011, titled "Simulated Paper Texture Using Glossmark on Texture-Less Stock", by Mu Qiau et al.

GB Search Report, Application No. GB1212131.5, Dated Nov. 12, 2012 Date of Search Nov. 9, 2012.

* cited by examiner

SIMULATED PAPER TEXTURE USING CLEAR TONER AND GLOSSMARK ON TEXTURE-LESS STOCK

INCORPORATION BY REFERENCE

This application is related to co-pending, commonly assigned U.S. patent application Ser. No. 12/913,226, filed Oct. 27, 2010, entitled "SIMULATED PAPER TEXTURE USING CLEAR TONER ON UNIFORM SUBSTRATE", and naming Mu Qiao, et al., as inventors, and is incorporated herein by this reference in its entirety.

This application is also related to co-pending, U.S. application Ser. No. 13/031,646, filed Feb. 22, 2011, entitled "SIMULATED PAPER TEXTURE USING GLOSSMARK ON TEXTURE-LESS STOCK", by Mu Qiao, et al., as inventors and is incorporated herein by this reference in its entirety.

Cross reference is also made to U.S. Pat. No. 7,352,493, issued Apr. 1, 2008, entitled "ENHANCEMENT OF GLOSSMARK IMAGES AT LOW AND HIGH DENSITIES", and naming Chu-Heng Liu, et al., as inventors, and is incorporated herein by this reference in its entirety.

BACKGROUND

The present disclosure is directed toward a method and an apparatus for providing a perceived texture on a substantially uniform print media substrate. More specifically, the textured appearance is provided on a print of a primary image using a clear toner applying component for low coverage portions of the primary image and a pigmented toner applying component for high coverage portions of the primary image.

A textured substrate is a print media having a noticeable third dimension resulting from raised pattern portions. Textured substrates are used to provide an attractive appearance in products, such as, business cards, greeting cards, scrapbook pages, wallpaper, wrapping paper, and other paper and fabric-based merchandise. The techniques and materials used to produce the textured patterns may add significantly to the production costs. In addition to higher consumer costs, textured substrates tend to provide less sharp results during electronic printing. For example, text can be illegible if it is printed on rough textured patterns. Traditional printing techniques, utilizing a press, provide clear text results on textured substrate because an inked surface of the press contacts the textured print media. However, ink or toner materials used for electronic, laser, digital, and xerographic printing techniques are lightly applied to the substrate. The toner or ink tends to not reach recessed portions of the substrate surface. Because consumer image forming devices situated in homes and offices generally print using electronic methods, there is a need for providing a textured appearance on uniform substrates.

One approach for providing a perceived texture on a uniform print media substrate includes applying a layer of clear toner over portions of a print of a primary image that are desirably raised relative to recess portions. In another approach, the print of the primary image is rendered at variable screen angles. A first halftone dot orientation is rendered onto the uniform substrate to represent the raised portion and a second, different halftone dot orientation is rendered onto the substrate to represent the recessed portion. Generally, a gloss differential between the raised and recessed portions provides a perceived texture on the uniform substrate.

In conventional glossmark applications, the gloss differential is achieved by alternating between two halftone types that are selected to have similar density characteristics while displaying distinctly different anisotropic structure orientations. However, rendering of the desired glossmark is only effective where the halftone structures in the primary image can be changed significantly without altering the visual colors and densities. Very low density areas, such as background areas and highlight areas, display minimal to no differential gloss effect, thus rendering any desired perceived texture placed thereupon invisible due to the absence of colored toner. Fully saturated areas, on the other hand, require complete toner coverage. The anisotropic halftone dot gloss structure, and therefore the perceived texture, is lost.

One approach for enhancing gloss differential at high and low coverage areas includes applying clear toner coincident with a select one anisotropic halftone screen. Another approach for enhancing the glossmark across a low coverage area is to apply a low density pattern of light color to all low density areas of the halftone image. A further approach includes applying an under-color to all high density areas in the halftone image. The underlying color halftone structure modifies the gloss.

A problem with these gloss enhancement approaches is that they do not consider an additional layer of information representative of the texture element. Texture is represented as various degrees of shading in a two-dimensional copy of a three-dimensional substrate. In one embodiment, the raised and recessed portions of the original textured substrate can be represented by different luminance values in the textured image data. The brightness is the toner density.

Therefore, there is needed a system that can distinguish between a low toner coverage corresponding to a color of the primary image and a low toner coverage corresponding to a degree of shading (i.e., a degree of dimension) of the textured image. In this manner, a perceived texture can be evenly discernable across an entire output image despite descriptions in the primary image data.

BRIEF DESCRIPTION

A first embodiment of the present disclosure is directed toward a method for providing simulated texture on a uniform print media substrate. The method includes receiving a primary image as input data to a digital front-end (DFE). The method further includes receiving textured image data for rendering a perceived non-uniform texture on a printed output of the primary image. The primary image input data is used for determining a low coverage portion and a high coverage portion. The method then includes applying clear toner to the low coverage portion and applying colored toner to the high coverage portion. The method includes applying the colored toner at variable anisotropic structures.

Another method according to the subject matter of the present disclosure is directed toward formulating an output having a simulated texture. The method includes determining low and high coverage portions in primary image data. The method further includes determining raised and recessed portions in textured image data. A print instruction is generated by concatenating the textured image data and the primary image data. The method next includes assigning a first toner application process for the low coverage portion and a second, different toner application process for the high coverage portion. The first and second toner application processes are adapted for rendering the raised and recessed portions on an associated hard uniform print media substrate.

A further embodiment discussed in the present disclosure is directed toward a system for providing a perceived texture on a uniform substrate. The system includes a textured image source that is adapted to provide an original texture description. A primary image source is adapted to provide a primary image description. The system further includes a processor that is adapted to divide pixels of the primary image data into a first group having low toner coverage and a second group having high toner coverage. The processor is further adapted to divide pixels of the textured image data into a third group corresponding to a raised texture portions and a fourth group corresponding to a recessed texture portions. The processor is adapted to generate a print instruction by concatenating the textured image data and the primary image data. The system further includes an image forming apparatus that is adapted to render a perceived texture on a substrate by applying clear toner for pixels corresponding to both the first and third groups and applying colored toner at a first anisotropic orientation for the pixels corresponding to both second and third groups and applying the colored toner at a different anisotropic orientation for the pixels corresponding to both the second and fourth groups.

DETAILED DESCRIPTION

The present application is directed toward a generation of perceived texture using multiple rendering processes on a generally uniform substrate corresponding to different coverage levels of an input image. In one exemplary embodiment, a first process includes applying a layer of clear toner over a portion of a printed image. A second rendering process includes using Glossmark™ technology, which is based on a differential gloss characteristic, for providing a second portion of the printed image. The technique disclosed herein creates a perceived textured appearance using the clear gloss layer and differential gloss characteristics for different portions of an image. The portions may be discerned relative to one another as each immitating the raised and recessed texture portions, respectively, when a viewer holds a substrate at an angle. The present disclosure is directed toward using different type toners to form a perceived textured substrate, which can be a uniform, substantially texture-less substrate having a textured appearance provided by printing. The disclosure is further directed toward a method for forming the perceived textured substrate and an apparatus adapted to produce the substrate. The substrate may be any two-dimensional material adapted to carry toner and/or liquid ink (hereinafter collectively referred to as "toner") applied using electronic, digital, xerographic, or laser printing methods. The substrate may include, for example, cardstock, papers, and fabrics.

Texture, as it is described herein, refers to a third dimension. The perceived textured substrate of the present application is substantially a two-dimensional material given a perceived third-dimensional appearance. In some embodiments, however, the material may be given an actual third dimension based on certain later discussed select pile heights. More specifically, the textured substrate includes a variable (or non-uniform) surface portion. A uniform surface, as described herein, includes a generally smooth substrate surface area. A textured surface alternately includes variable heights and/or impressions formed across the surface area. Variable patterns are formed by first portions that are generally raised relative to second ("recess") portions. A perceived textured substrate may include a slight non-uniform surface to the touch based on an amount of toner being applied at variable pile heights. The pile heights may be used to selectively build raised toner portions relative to the substrate surface. However, the perceived textured substrate of the exemplary embodiment may include a generally uniform surface having an appearance of raised and recess portions. This non-uniform appearance may be rendered using an anisotropic (s.a., halftone rendering) technique that is disclosed herein.

Figure 1:
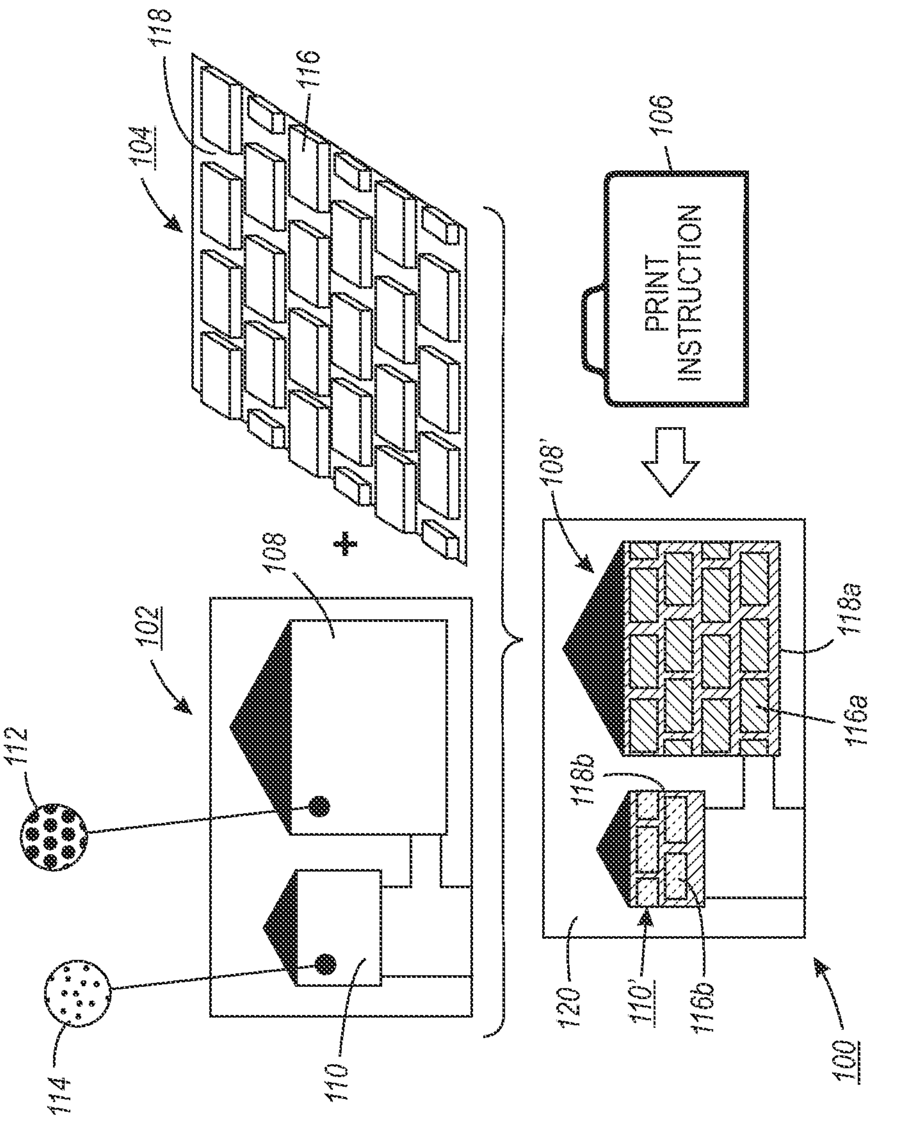
FIG. 1 depicts a formation of a perceived texture image generated from a primary image description and a textured image description.

FIG. 1 depicts a creation of a perceived texture image 100 according to an exemplary embodiment of the present disclosure. Descriptions for a primary image 102 and an original texture 104 are concatenated to form a print instruction 106 for providing a print output of the perceived texture image 100. In the illustrated example, the primary image 102 includes a (pictorial image of a) house or first structure 108 in a foreground of the document and a (pictorial image of a) garage or second structure 110 behind the first structure 108. The image is not limited to photos or graphics. Rather, it can include text or other information that forms a shape on a page. The structures 108, 110 are used herein as examples only for describing the creation process. The images are not to be held limiting to any specific type of image or arrangement relative to one another. In contemplated embodiments, a first image can be a foreground body image and a second image can be a background proximate to and/or surrounding the foreground body image.

In the example embodiment, the first structure 108 of the primary image 102 is a first color rendered by a first colorant, such as, e.g., a pigmented toner, having a first toner coverage level. The second structure 110 of the primary image 102 is rendered by a second colorant, s.a., e.g., a pigmented toner, having a second toner coverage level. The second colorant can be the same as or different from the first colorant. However, in the example embodiment, the second toner coverage level is different from the first toner coverage level. Enlarged views of portions of the first and second structures 108, 110 show the first and second toner coverage levels 112, 114. A first enlarged view of the first structure 108 portion illustrates the first toner coverage level 112 having a first density representative of the placement of halftone dots relative to one another. A second enlarged view of the second structure 110 portion illustrates the second toner coverage level 114 having a second density representative of the placement of halftone dots relative to one another. The enlarged views show that the first toner coverage level 112 is higher than the second toner coverage level 114. For purposes hereafter, the first toner coverage level 112 is referred to as high toner coverage level and/or portion(s) and the second toner coverage level 114 is referred to as low toner coverage level and/or portion(s).

With continued reference to FIG. 1, the original textured image 104 is shown as a repeating brick pattern. However, there is no limitation made herein to the type of pattern or to an organization of the pattern (e.g., repeating or not repeating). The brick pattern is selected herein for description purposes only. The original textured image 104 is a three-dimensional pattern including (elevated) brick portions 116 relative to mortar portions 118. The brick portions 116 are determined as being raised portions and the mortar portions 118 are determined as being recessed portions for purposes of generating the print instruction 106.

With continued reference to FIG. 1, the print instruction is formed for creating a document that outputs a hard copy printout of the primary image including a perceived texture representative of the textured image. Accordingly, the print instruction 106 is adapted to provide the perceived texture image 100 similarly shown as the first structure 108 and the second structure 110. However, select rendering processes are used herein for providing the perceived brick and mortar portions 116, 118. More specifically, a first rendering process is used for the high toner coverage portion 112 (and therefore for rendering the first structure) of the primary image 102 and a second rendering process is used for the low toner coverage portion 114 (and therefore for rendering the second structure) of the primary image 102.

For the high toner coverage portions 112 of the primary image 102 rendered in the perceived texture image 100, a first perceived texture structure 108' is rendered onto a substantially uniform substrate 120 as a Glossmark™ textured image, which may be achievable using different anisotropic or halftone screens. For the low coverage portions 114 of the primary image 102 rendered in the perceived texture image 100, a second perceived texture structure 110' is rendered onto the substrate 120 using at least one layer of clear toner.

More particularly, a patchwork of halftones create the first perceived raised brick portions 116*a* relative to the first perceived recessed mortar portions 118*a* in the first perceived texture structure 108'. The first structure 108 of the primary image 102 and the textured image 104 are combined by screening one-dimensional first perceived raised brick portions 116*a* within the first structure 108 with a first screen and screening first perceived recessed mortar portions 118*a* within the first structure image 110 with a differential gloss pattern, which is screened with a second halftone screen. The resulting first perceived texture structure 108' is a patchwork of the rotated anisotropic structures created by the two screens rendered on the substrate 120. While the exemplary first rendering embodiment is described in terms of two halftone structures, it will be appreciated that more than two rotated anisotropic structures may be employed in creation of the first perceived texture structure 108'.

A different rendering process is used for creating second perceived raised brick portions 116*b* relative to second perceived recessed mortar portions 118*b* in the second perceived texture structure 110'. A first layer of colored toner is rendered onto the substrate for providing an image of the second perceived texture structure 110'. This first layer further corresponds to the second perceived recessed portions 118*b*. Then, a second layer of clear toner is rendered over the first layer of colored toner (shown in dotted line at 116*b*) at the pixels corresponding to the raised brick 116 in the original texture image 104. Accordingly, the second layer of clear toner provides the second perceived raised brick portions 116*b*. The clear toner is formed of the same particles used in primary and subtractive (e.g. CMY and K) toners, except that the clear toner excludes the pigmenting component. In one embodiment, the toner may have a slight cast when it is applied to the substrate. This cast may provide a visual appearance of raised portions against recesses on the substrate. The clear toner may also provide a glossy appearance. Therefore, the second perceived raised brick portions 116*b* are discernable relative to the second perceived recessed mortar portions 118*b* because of the different reflection characteristics of the clear toner relative to the colored toner.

The image data thus formed for the print instruction 106 may be stored as a digital image data file to be rendered by the same or a different image forming apparatus or device from that device used for creating the digital image file. For example, the image data file may be stored for later rendering on an image forming apparatus that does not have software for creation of differential gloss images.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The method illustrated in FIGS. 3-6 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Figure 2:
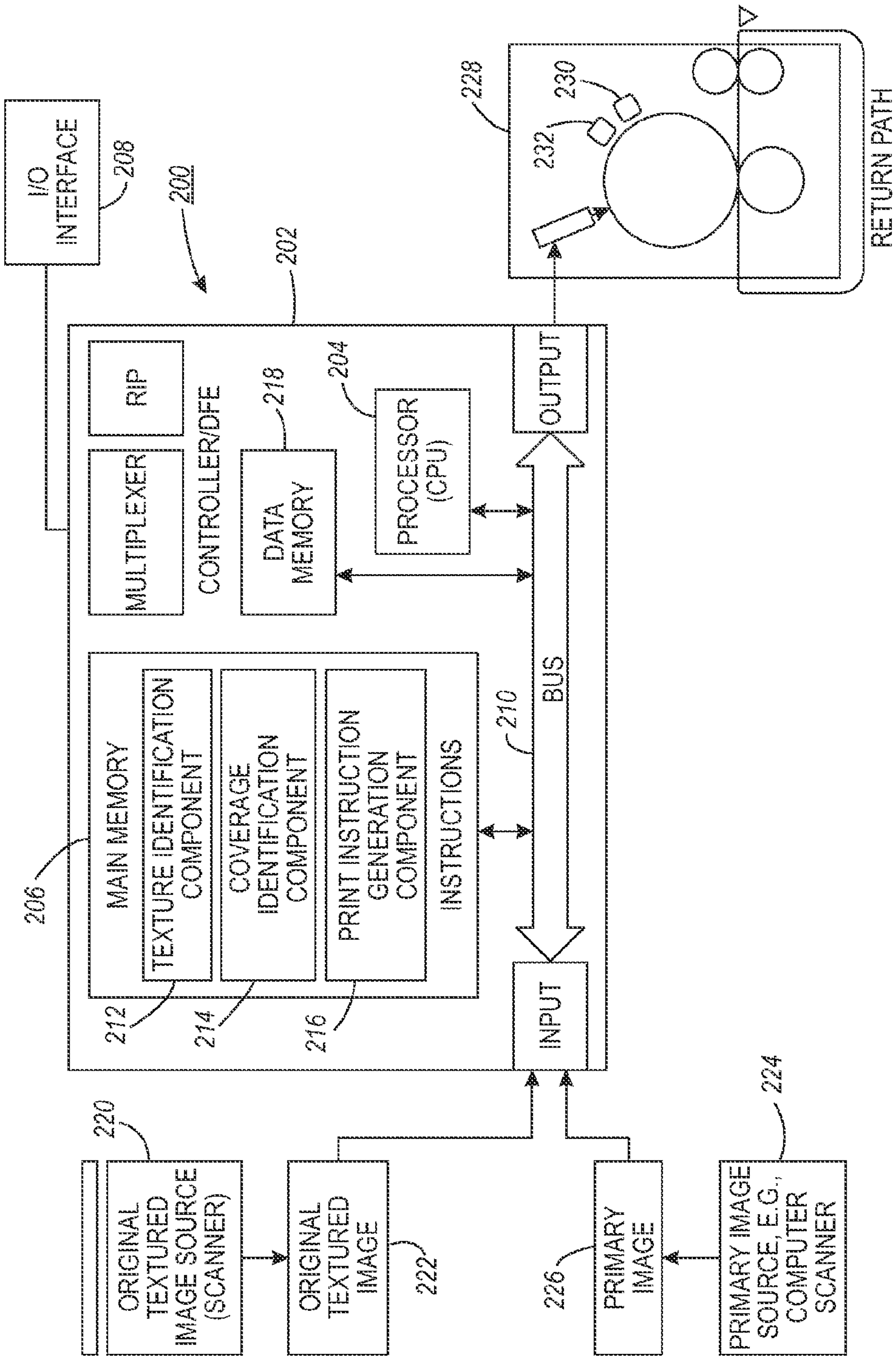
FIG. 2 is a functional block diagram of a system for generating a perceived texture appearance on a uniform substrate.

With reference to FIG. 2, a functional block diagram of a computer system 200 is shown. The computer system 200 may be a PC, such as a desktop, a laptop, palmtop computer, portable digital assistant (PDA), server computer, cellular telephone, pager, or other computing device capable of executing instructions for performing the exemplary method. The computer system 200 may be further embodied in a networked image forming apparatus, although it is also contemplated that the system may be located elsewhere on a network to which the image forming apparatus is connected, such as on a server, networked computer, or the like, or distributed throughout the network or otherwise accessible thereto. The network interface allows the computer to communicate with other devices via a computer network, such as a local area network (LAN), a wide area network (WAN), or the internet, and may comprise a modulator/demodulator (MODEM).

The illustrated computer system 200 includes a controller 202 formed as part of at least one image forming apparatus for controlling an operation of at least one marking (or print) engine for forming the perceived texture on print substrates. Alternatively, the controller 202 may be contained in a separate, remote device that is connected with the image forming apparatus. The instruction data may be output from the controller 202 for further print processing at the print engines. The controller 202 contains a processor 204, which controls the overall operation of the computer system 200 by execution of processing instructions which are stored in memory 206 connected to the processor 204. Computer system 200 also includes a network interface and a user input output interface 208. The I/O interface 208 may communicate with one or more of a display, for displaying information to users, and a user input device, such as a keyboard or touch or writable screen, for inputting instructions, and/or a cursor control device, such as a mouse, trackball, or the like, for communicating user input information and command selections to the processor. The various components of the computer 200 may be all connected by a bus 210. The processor 204 executes instructions for performing the method outlined in FIGS. 3-6.

The electronic textured and original image data is processed by the processor 204 according to the instructions contained in the memory 206. The memory 206 stores a texture identification component 212, which identifies pixel cells representing textured regions from an original three-dimensional texture description, a coverage level identification component 214, which identifies portions of a primary image including high coverage levels and/or low coverage levels, and a print instruction generation component 216, which assigns a toner rendering process to each pixel cell of an output image. These components 212-216 will be later described with reference to the method. The data undergoes processing according to the various components for generating a print instruction, which is stored in the data memory 218.

The memory 206 stores instructions for performing the exemplary method as well as the processed data. The memory 206 may represent any type of tangible computer readable medium such as random access memory (RAM), read only memory (ROM), magnetic disk or tape, optical disk, flash memory, or holographic memory. In one embodiment, the memory 206 comprises a combination of random access memory and read only memory. In some embodiments, the processor 204 and memory 206 may be combined in a single chip.

FIG. 2 further illustrates the computer system 200 connected to an original textured image source 220 for inputting a texture description into the computer system 200. This textured image source 220 may include an image capture device, such as a scanner, a camera, or a profilometer, for converting an original three-dimensional image 222 into a two-dimensional electronic format. A primary image source 224 is also connected to the computer for inputting a primary image 226 into electronic format. This primary image source 224 may include the same or a separate image capture device, such as a scanner, a computer, or the like, as the original image source 220. The original texture and primary image sources 220, 224 are in communication with the controller 202 containing the processor 204 and memory 206.

In another embodiment, the original textured and primary image descriptions 222, 226 may be input from any suitable image source 220, 224 such as a workstation, a database, a memory storage device, such as a disk, or the like. Typically, each input digital image includes image data for an array of pixels forming the image. The image data may include colorant values, such as grayscale values, for each set of color separations, such as L*a*b or RGB, or be expressed in another color space in which different colors can be represented. In general, "grayscale" refers to the optical density value of any single image data channel, however expressed (e.g., L*a*b, RGB, YCbCr, etc.). The images may be photographs, video images, combined images which include photographs along with text, and/or graphics, or the like. The images may be received in JPEG, GIF, JBIG, BMP, TIFF or other common file format used for images and which may be converted to another format such as CMYK colorant values prior to processing. Input textured and original images may be stored in the data memory during processing.

An image forming apparatus, as used herein can include any device for rendering an image on print media, such as a laser printer, bookmaking machine, or a multifunction machine having copying and/or faxing as well as printing capability. "Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the image forming apparatus and may include text, graphics, pictures, and the like. The operation of applying images to print media, for example, graphics, text, photographs, etc., is generally referred to herein as printing or marking. While in the exemplary embodiment, the image forming apparatus is described in terms of a xerographic printer, it is also contemplated that the image forming apparatus may incorporate inkjet or other marking technology.

The image forming apparatus includes a marking engine 228. A pigmented toner applying component 230, such as a cartridge, supplies colored toner for applying to a substrate passing through the marking engine 228. In an exemplary embodiment, four CMYK colorant toners are used. A clear toner applying component 232, such as a cartridge, supplies clear toner for applying to a substrate passing through the marking engine 228 or a different marking engine. The marking engine 228 includes many of the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which include a cleaning device, a charging station to be applied (five in the case of a CMYK and clear printer), such as a charging corotron, an exposure station, which forms a latent image on the photoreceptor, a developer unit, associated with each charging station, for developing the latent image formed on the surface of the photoreceptor by applying a toner to obtain a toner image, a transferring unit, such as a transfer corotron, for transferring the toner image thus formed to the surface of a print media substrate, and a fuser, which fuses the image to the substrate. The fuser generally applies at least one of heat and pressure to the sheet to physically attach the toner.

Although the methods are illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system, wherein the disclosure is not limited to the specific applications and embodiments illustrated and described herein.

Figure 3:
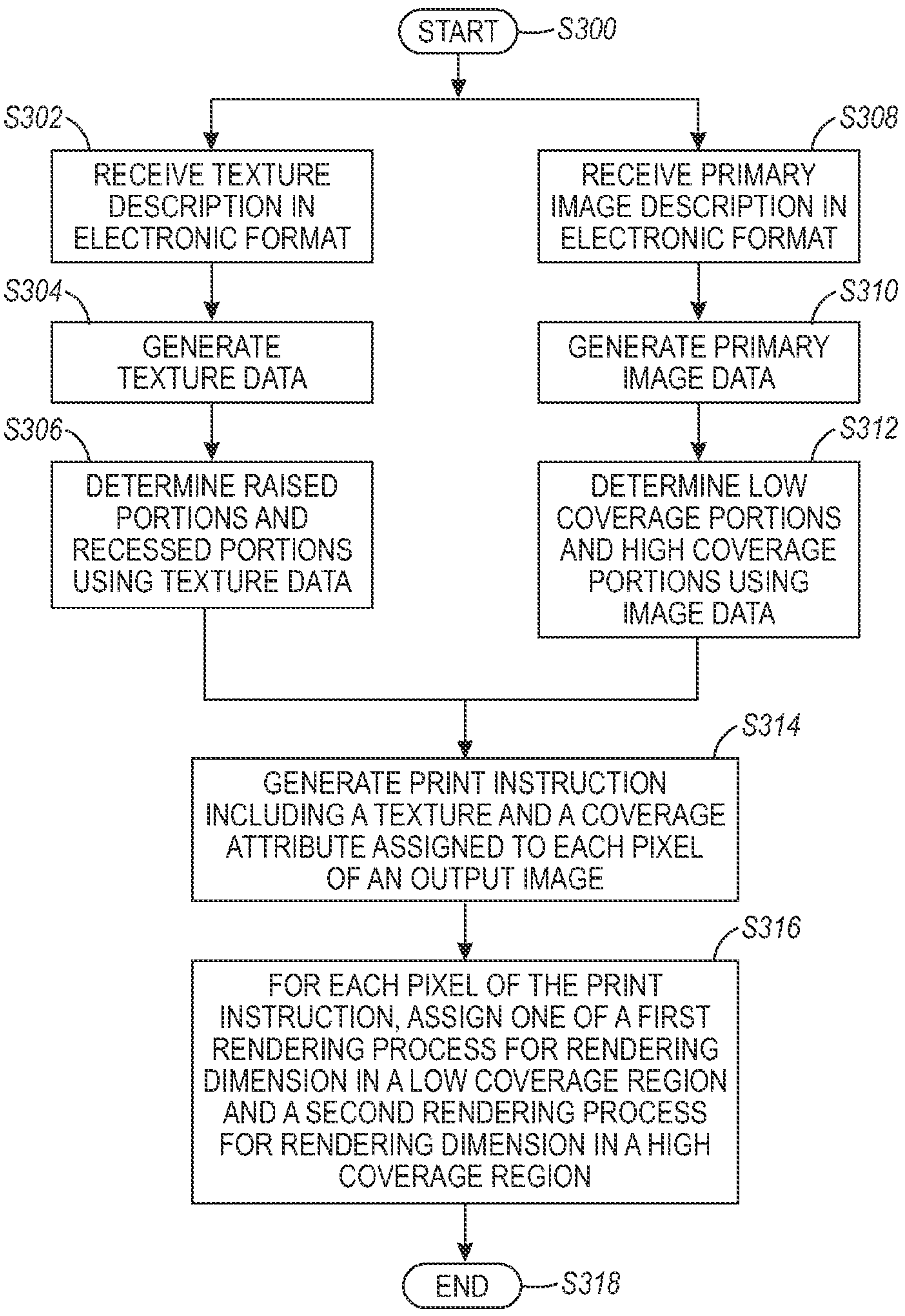
FIG. 3 is a flowchart depicting an overview of the method embodiments according to the disclosure.

FIG. 3 shows an overview of a method for generating a perceived texture output according to the subject matter of this disclosure. The method starts at S300. A texture description is received at the DFE at S302. As mentioned, the texture description can be received by an original textured image input device. For example, a non-uniform substrate, having a third dimension that provides a tactile effect to the substrate, can be scanned for providing input data. The scanner receives the texture description as being descriptive for a two-dimensional copy of the substrate. Another example method for receiving the texture description includes receiving measurements form a profilometer, receiving a texture description from a computer library, creating a texture description via user-design in an application, and/or receiving electronic data carried on media. Returning to the example of receiving the texture description at S302 by means of a scanned textured image, the two-dimensional electronic copy of the non-uniform, three-dimensional substrate includes shadows and shadings that are generally representative of different degrees of dimension (i.e., raised portions relative to recessed portions) that appear in the non-uniform, three-dimensional substrate. The DFE generates texture instruction data at S304. For the scanned copy example discussed above, the texture instruction data includes pixel values representative of the shadows and shadings. In one example, the texture instruction data may include grayscale values for each pixel. In one embodiment, the lighter shades are representative of recesses in the original three-dimensional textured substrate, wherein white may be representative of the lowest recessed portion (s.a., the original surface of the print media substrate before texture was built upwardly thereon). The darker shades of gray-to-black are representative of raised portions, wherein the degree of darkness is representative of the degree of dimension of a raised portion relative to the recessed portion. The texture instruction data is used to determine texture at S306. More particularly, the pixel values texture instruction data is used to determine the raised and recessed portions.

Continuing with reference to FIG. 3, the method continues with the receipt of primary image data at S308. The primary image data can be provided to the system by a primary image input device, such as a scanner. The scanner can be the same scanner used for inputting the texture in S302 or it can be a different scanner. In this manner, a primary image can be received at the DFE in electronic format. Furthermore, the primary image description can be received in electronic format carried on media. Alternatively, the primary image can be created using an application, uploaded form a network, or received by any conventional means. The primary image description gets rasterized to generate primary image data at S310. This image data includes color information for each pixel. In one embodiment, this color information is represented as CMYK values for each pixel. The present example is described for an input CMYK image, but data can be received in any format and converted to a CMYK format. As mentioned, the received image is not limited to photos or graphics, but can include text or other information that forms a shape on a page.

With continuing reference to FIG. 3, the method continues with using the primary image data to determine toner coverage at S312 of the primary image. More particularly, high toner coverage portions are distinguished from low toner coverage portions in the primary image. In other words, each pixel is identified as having a high toner coverage (i.e., density) value or a low toner coverage value.

Continuing with reference to FIG. 3, the system next generates a print instruction at S314. The print instruction is created for providing a hard copy (print) output of the primary image having a visually perceived texture on a two-dimensional print media substrate. Accordingly, the print instruction is created for producing the output image. Each pixel of the output image is assigned a first attribute corresponding to a texture and a second attribute corresponding to a toner coverage level. In one embodiment, the pixel of the primary image data is modified to include a tag indicating a texture attribute. In another embodiment, at least the coordinate information for each pixel describing the primary image can be used to assign coordinate information for the pixels describing the output image.

With continuing reference to FIG. 3, a rendering process is assigned to each pixel of the print instruction at S316. A first rendering process is assigned to select pixels for rendering perceived texture in low coverage portions of the output image and a second rendering process is assigned to select pixels for rendering the perceived texture in high coverage portions of the output image. The first and second rendering process assignments are based on the texture and toner coverage attributes. The method ends at S318.

Figure 4:
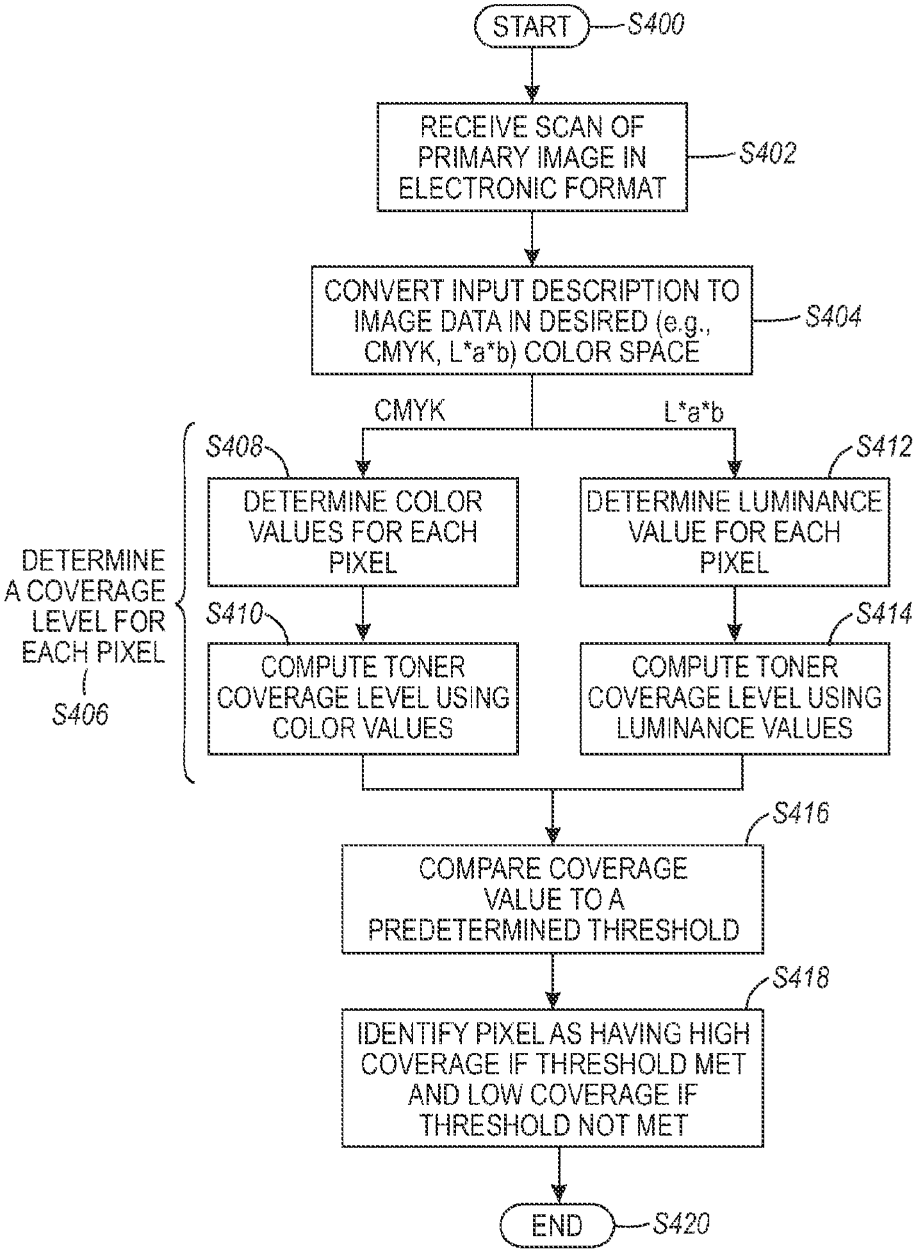
FIG. 4 is a flow chart depicting a method according to an embodiment of the disclosure for determining high and low coverage portions in the primary image.

Now referring to FIG. 4, a method is described for determining the toner coverage portions discussed in S312 of FIG. 3. The method starts at S400. The primary image is received at S402 in electronic format. More specifically, the primary image is received as an image description in a first format or color space. The image can be represented, for example, in an RGB, CMYK, CIELAB, CIEXYZ, or any other color space. There is no limit made herein to a particular format for the input primary image description. The input primary image description is converted to a desired print format at S404. In one example, the primary image description is rasterized to generate image data in a CMYK print format (i.e., color space). As mentioned, the image data includes color (e.g., CMYK) values for each pixel of the primary image.

With continued reference to FIG. 4, the image data is used to determine a coverage level for each pixel at S406. In one embodiment including input data in a CMYK format, color values are determined for each pixel of the image data at S408. The color values are used to compute a toner coverage level (and/or value) for each pixel at S410. In another embodiment, the color values can be used as an input value that is applied to a look-up table (LUT), which outputs the toner coverage value. In another embodiment, the color value can be used as an input value in a programmed algorithm that outputs the toner coverage value and/or level. It is further contemplated that in some embodiments the LUT can be adapted to determine the coverage value and/or level as well as perform the conversion S404 of the input color space to the output color space at one time.

With continued reference to FIG. 4, in one embodiment including input data in the L*a*b format, luminance values (which is proportional to density) are determined for each pixel of the image data at S412. The luminance value is used to compute the toner coverage level for each pixel at S414. In one embodiment, the luminance value can be used as an input value that is applied to an LUT for outputting the toner coverage value. It is further contemplated that the toner coverage value can be output from an algorithm that uses the luminance value as an input variable.

With continued reference to FIG. 4, the determined coverage value is compared to a predetermined threshold at S416. This threshold is a coverage level that displays a weakened differential gloss affect when colored toner is rendered onto a uniform print media substrate. Generally, the threshold is used to identify low density areas of the primary image so that the perceived texture is not reduced and/or lost in these areas. Each pixel is identified at S418 as having high coverage if the threshold is met and low coverage if the threshold is not met. In other words, each pixel is identified as having high coverage if the coverage level is equal to or greater than a predetermined threshold or identified as having low coverage if the coverage level is below the predetermined threshold. More generally, high coverage portions and low coverage portions of the primary image are identified. The method ends at S420.

Figure 5:
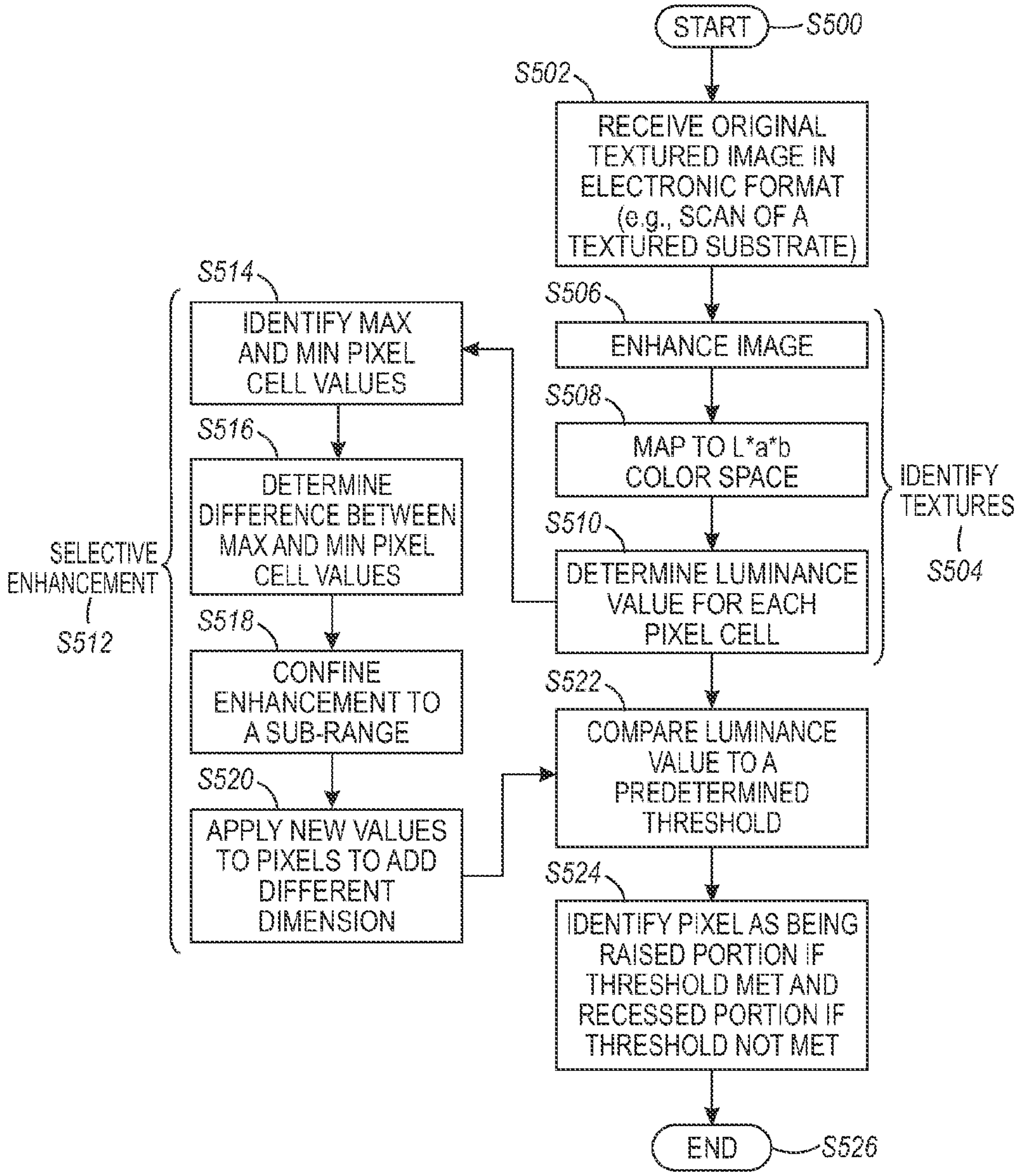
FIG. 5 is a flow chart depicting a method according to an embodiment of the disclosure for determining raised and recessed portions that provide a tactile effect in the original textured image.

Now with reference to FIG. 5, a method is shown for determining the raised and recessed portions of the textured image received at S302 in FIG. 3. The method starts at S500. An original textured image is received in electronic format at S502. For example, as mentioned, a three-dimensional textured substrate can be scanned with an image capture device. The original textured substrate may be scanned at S502 to convert a three-dimensional pattern to (two-dimensional) electronic information. In one embodiment, a high resolution scanner may be used. The textured substrate is preferably a plain (or white) substrate having no pigmented toners previously applied to it. The scanned original image may be mostly white with a low dynamic range.

Alternative methods to scanning an original substrate may be used for providing data in electronic format. In one embodiment, a profilometer may be used to measure a profile of a surface portion of the original textured substrate. The measurement(s) may be used to generate a quantified variable, such as roughness. Another alternate method to scanning the three-dimensional pattern may include, for example, mathematically creating a texture using existing techniques in computer graphics. The texture may be viewed on a monitor and leveraged for texting and/or shading and other visual effects on the substrate. Graphics libraries may be incorporated into and/or used by a plug-in. For example, OpenGL or DirectX built-in to a particular operating system such as Widows, Mac, or Linux may be used to access online libraries. Computer graphics algorithms may be applied to synthesized textures to provide additional realism or other visual effects. It is contemplated that textures may be procured (without cost or for a fee) from online libraries that contain a variety of hopsack, ruche, linen-embossed, hammered, burlap, floral, vector, cork, denim, and brick patterns, etc. The aforementioned list is not meant to be limiting; rather, it includes examples only. Accordingly, an image processing algorithm may be applied to the received textured image to digitally control the amount of perceived texture subsequently printed on a uniform print media.

Figure 8:
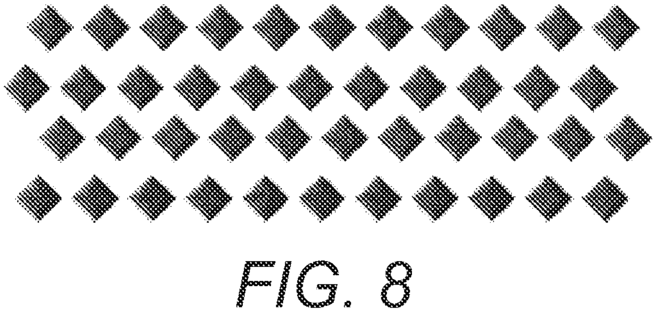
FIG. 8 illustrates an example pattern that may be provided as an original texture image.

In yet another embodiment, a texture description may be generated by user-design. FIG. 8 illustrates, for example, an evenly spaced diamond pattern that may be created by a user. This spaced apart shape texture (or a similar user-created texture) may be created using known applications. The user may input different degrees of shading to describe the aimed level of dimension. It is further contemplated in other embodiments that the system may automatically determine the texture description based on a type of substrate loaded into the apparatus.

Furthermore, the electronic data may be provided to the system. For example, the (previously generated) electronic data may be carried on a media disc, flash drive, zip drive, and the like, and transferred to the system. The electronic data may be communicated to and/or uploaded to the controller for processing in a conventional manner.

With continued reference to FIG. 5, the scanned or alternatively produced original textured image data may be contained in the memory until it selectively undergoes processing to identify the various textures (and/or textured regions) at S504. In one embodiment, the processing of the texture identification component (or any later discussed component) may be instituted by means of a (received) user selection or instruction for creating a perceived textured description. This instruction may be instituted, for example, by selection of an application for print preview or a print command option. In another embodiment, the texture determination and/or generation actions may be instituted by a received user-selection for a "texture generation" application available with the platform used to modify the textured image description in a respective program.

Figure 7:
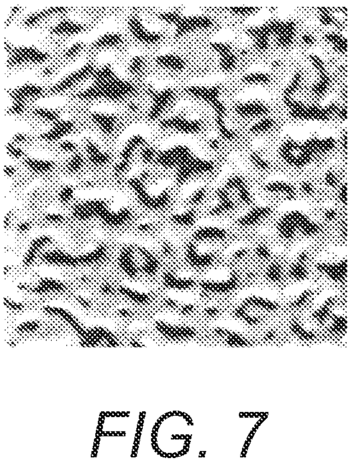
FIG. 7 illustrates an enhanced texture of an original three-dimensional textured substrate converted to electronic format.

There are certain original textured substrates that include non-uniform regions that are microscopic, i.e., the relative raised and recess portions cannot be seen by a naked eye. To simulate the respective texture, the (scanned or displayed) original image may be enhanced and/or enlarged at S506 to make the recesses and/or raised portions viewable to the naked eye. FIG. 7 illustrates an enhanced texture of a three-dimensional textured substrate converted to electronic format.

With continued reference to FIG. 5, the processor next extracts different (brightness) values for distinguishing between the raised and recess regions of the original three-dimensional textured substrate. More specifically, the regions are identified by mapping image pixel values to a suitable color space at S508, such as an L*a*b color space. Accordingly, each pixel of the enhanced image may be described as a single number (at S510) representing a luminance L of the pixel between 0 and 255 on an 8-bit scale. An LUT, a computation, or any known method may be used to map the color channels into the L*a*b color space. The value zero (0) is assigned to black pixels and the value 255 is assigned to white pixels, wherein any value in between the 0 and 255 range describes a different shade of gray. As mentioned, the shades of gray correspond to variable heights of raised portions in the original textured substrate.

With continued reference to FIG. 5, in a further stage of the process, operations may be performed to selectively control a degree of the enhancement at S512 so that the original texture description is not over- or under-enhanced when it is converted to electronic format. A luminance range may be controlled using the selective enhancement component to enhance the perceived texture applied to the uniform substrate. To control the enhancement, maximum and minimum values may be identified at S514 after the luminance values are determined at S510. A difference between the maximum and minimum values may be computed at S516 to generate a partial dynamic range. The partial dynamic range may then be enhanced to a full dynamic range. More specifically, the enhancement may then be confined to a selected sub-range S518 that is not as strong as the full dynamic range. A modified luminance value within the sub-range is assigned to each pixel cell at S520. In one embodiment, for example, the pixel values may be confined to a sub-range that is approximately one-half the full range. For example, the pixel values may be confined to a range of from about 63 to about 192. This function provides for additional control on how the simulated texture output will appear. More specifically, confining the pixels to a sub-range provides a perceived texture that may appear more or less similar to the actual texture. The method employed may be an "S-curve" contrast enhancement algorithm that extends the dynamic range of the original texture, e.g., to the full dynamic range of 0-255.

With continued reference to FIG. 5, the determined luminance value obtained from the mapping of S506 and/or the selective enhancement of S512 is compared to a predetermined threshold at S522. This threshold is a value that displays a weakened or less discernable dimension when clear or colored toner is rendered onto a uniform print media substrate. Generally, the threshold is used to identify high and low luminance areas of the textured image so that the perceived texture is not reduced and/or lost in these areas. Each pixel is identified at S524 as being a raised portion if the threshold is met and being a recessed portion if the threshold is not met. More generally, raised and recessed portions of the original textured image are identified. The method ends at S526.

Figure 6:
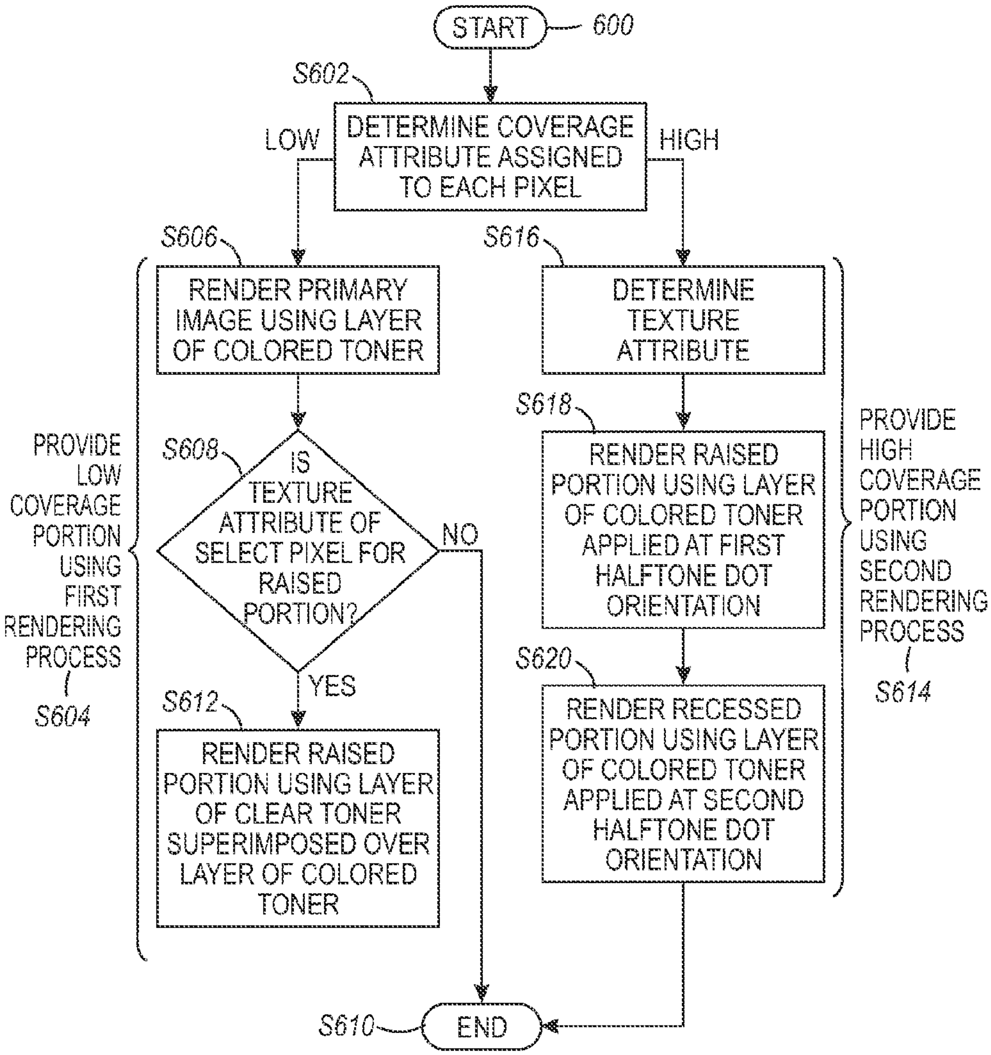
FIG. 6 is a flow chart for providing the perceived texture on a hard copy output.

Now referring to FIG. 6, a method is shown for rendering a perceived texture image on a substantially uniform print media substrate. The image is more particularly defined as having a shape, boundaries, and color of the primary image, but filling a select portion of that image with a perceived texture. The method starts at S600. The coverage attribute assigned to each pixel cell is determined at S602. As mentioned, different rendering processes are used to render portions of the output image having low toner coverage and high toner coverage. The rendering process for the pixels assigned the low toner coverage attribute is discussed first.

With continuing reference to FIG. 6, the low coverage portions of the output image proceed to be provided by the first rendering process at S604. the image is rendered using a layer of colored toner at S606. Generally, the low toner coverage portions of the output image are rendered with a colored toner in the same manner as the rendering of the original primary image. This layer is applied because the rendering process used for the low toner coverage portions generally provides for a treatment layer for only the raised portions, and the raised portions are thus made discernable against the first colored toner layer (corresponding to recessed portions). The texture attribute for a pixel is determined at S608. If the pixel is assigned a texture attribute identifying it as being included in a recessed portion, the method ends at S610. However, if the pixel cell is assigned a texture attribute identifying it as being included in a raised portion, a second layer of toner is superimposed on the first layer rendered in S606. More specifically, a layer of clear toner is superimposed over the layer of colored toner at S612. The clear toner is formed of the same particles used in primary and subtractive (e.g. CMY and K) toners, except that the clear toner excludes the pigmenting component. In one embodiment, the toner may have a slight cast when it is applied to the substrate. This cast may provide a visual appearance of raised portions against recesses on the substrate. The clear toner may also provide a glossy appearance. A technique for rendering the textured raised and recessed portions using a clear toner applying component is described, for example, in above-mentioned U.S. Ser. No. 12/913,226, incorporated herein by reference.

The clear toner imitates an appearance of texture, such as in textured substrates that are grooved or otherwise given a third-dimension. The clear toner may be selectively applied to the substrate at different halftone values to achieve a select degree of glossiness or cast. The degree of glossiness or cast corresponds to the degree of shadow and/or shading created in three-dimensional textured substrates by the raised and recessed portions. In other embodiments, the substrate may be subjected to multiple passes in the image forming apparatus to achieve a select pile height. The pile height may be achieved by laying a 100% halftone value per pass. The number N of passes through the apparatus results in a 100N % pile height. Variable pile heights may be utilized for different surface portions of the substrate so that a tactile differential may be felt to the touch. The pile heights may be determined based on received user selections made to options presented by a print driver. The pile heights may alternatively be based on programmed text patterns stored in the memory. The different amounts of clear toner applied to substrate (for the raised portions of the low coverage regions of the output image) build variable height at the select regions while defining recesses at the original uniform substrate surface. Accordingly, an actual, rather than a perceived, tactile sensation of texture may be obtained.

With continued reference to FIG. 6, the high coverage portions of the output image proceed to be provided by the second rendering process at S614. The second rendering process starts with determining the texture attribute at S616. A halftone dot orientation assigned to each pixel cell may correspond to whether that pixel cell is included in a recessed or a raised portion of the original textured image. The image data is flattened into zero (0) and one (1) data representations. In one embodiment, for example, the luminance values resulting from the mapping of S508 and/or the selective enhancement of S512 in FIG. 5 are used. The luminance values included in a first sub-range may be assigned a zero (0) value while luminance values included in a second sub-range may be assigned a one (1) value. The first sub-range, for example, may represent the lower one-half range for luminance values (e.g., 0-127). Hence the zero (i.e., the first sub-range) may represent recess portions of the perceived texture, which may appear as darker gray shades in the original scanned textured substrate. The one (i.e., second sub-range) may represent the upper one-half range for luminance values (e.g., 128-255). Hence, the second sub-range, for example, may represent raised portions of the perceived texture, which may appear as lighter gray shades in the original scanned textured substrate.

The pattern of zero and ones are then used to toggle between multiple halftone anisotropic structure orientations. More particularly, a multiplexer toggles between a first screen type halftone (for recess portions) and a second screen type halftone (for raised portions) to produce a composite result of raster input processed (RIP) image data for rendering at the marking engine.

Ideal screen angles for CMYK color printing place halftone screens at angles of 45° (Black), 75° (Magenta), 90° (Yellow), and 105° (Cyan). In one embodiment, the first screen type may include an assignment for these angles. The halftone screens align CMYK colored dots to form small rosettes that together make up a selected color. Each pixel requires four interleaved halftone cells, one for each color. Since the dot color for each of the four CMYK colors is only one fourth of the area, printing a solid expanse of one color is not possible. The cells are similar to patterned tiles, but there are angle combinations for which the tiling is possible. In order to rotate a halftone screen, the cell must be rotated.

Accordingly, the halftone screens for the cells assigned to a second screen type (i.e., the raised portions) may be rotated a select X-degree. In one embodiment, the angles may be rotated at 45-degrees. Accordingly, the screen angles for the CMYK color printing, for raised portions, may include halftone screens at 90° (Black), 120° (Magenta), 135° (Yellow), and 150° (Cyan). There is no limitation made to the degree of anisotropy used for the second screen angles. However, because cells have to tile, there are only so many combinations of angles available at a given resolution. If the angle combination is not available, the default action is to estimate a nearest approximation.

As mentioned, the orientations of the screens may be arranged at 90-degrees from one another to maximize the perceptibility of the gloss differential. In the discussed embodiment, the differential in gloss between the perceived raised portions and the perceived recess portions may be viewable at any angle.

With continued reference to FIG. 6, the raised portion is provided on the substantially uniform substrate at S618 by rendering a layer of colored toner at the first halftone dot orientation. The recessed portion is provided on the substantially uniform substrate at S620 by rendering a layer of colored toner at the second halftone dot orientation. The rendering of S618 and S620 (and S606) may occur simultaneously in a contemplated embodiment. A technique for generating and rendering the textured raised and recessed portions as a differential gloss pattern in a printed image is described, for example, in above-mentioned U.S. Ser. No. 13/031,646, incorporated herein by reference.

Generally, pixel cells rendered at the first screen type exhibit a first level of gloss. Similarly, pixel cells rendered at the second screen type exhibit a second level of gloss. The difference between the first level of gloss and the second level of gloss varies depending on a viewing angle of the perceived texture substrate. However, (a degree of rotation) is selected such that the gloss difference is always viewable even if the magnitude of that difference is not constant. The method ends at S610.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for providing simulated texture on a uniform print media substrate, the method comprising:

receiving a primary image as input data to a digital front-end (DFE);

describing a three-dimensional textured substrate as a two-dimensional image representing texture;

extracting brightness values for each pixel of the two-dimensional image, the brightness values representative of shadows and shadings in the two-dimensional image corresponding to a degree of dimension in the textured substrate;

determining a low coverage portion and a high coverage portion of the primary image using the primary image input data;

generating a print instruction for rendering the primary image with a perceived texture, the print instruction including coverage and brightness information for each pixel;

for the low coverage portion of the primary image, applying a first layer of colored toner and superimposing a second layer of clear toner over select portions of the colored toner based on the brightness values; and, for the high coverage portion of the primary image, applying the colored toner at variable anisotropic structures based on the brightness values.

2. A method according to claim 1, wherein the determining the low and high coverage portions includes:

determining a toner coverage value for each image pixel of the primary image using the primary image input data; and, comparing the toner coverage value to a threshold.

3. A method according to claim 1 further comprising:

concatenating a print instruction for the texture description with the primary image input data.

4. A method according to claim 1 further comprising:

identifying raised and recessed portions using the brightness values.

5. A method according to claim 4 further comprising:

applying the second layer of clear toner in the low coverage portion and in variable amounts each corresponding to the degree of dimension in the textured substrate for representing the raised and recessed portions in the rendered primary image.

6. A method according to claim 1, wherein the first layer of colored toner is rendered before the second layer of clear toner.

7. A method according to claim 1 further comprising:

applying the colored toner at a first anisotropic halftone angle in the high coverage portion for pixels having the brightness values meeting and exceeding a threshold; and, applying the colored toner at a second anisotropic halftone angle in the high coverage portion for pixels having the brightness values being lower than the threshold, the second halftone angle being different from the first halftone angle.

8. A computer product comprising a non-transitory tangible medium encoding instructions which, when executed, perform the method of claim 1.

9. A method for formulating an output having a simulated texture, the method comprising:

determining low and high coverage portions in primary image data;

receiving textured image data describing a three-dimensional textured substrate as a two-dimensional textured image;

determining brightness values for each pixel in textured image data;

identifying raised and recessed portions in the textured image data using the brightness values concatenating the textured image data and the primary image data to generate a print instruction for rendering a primary image having a perceived texture simulating a texture in the three-dimensional substrate;

for simulating the raised and recessed portions on an associated hard uniform print media substrate, assigning a first clear toner application process to pixels in the low coverage portion identified as belonging to the raised portions and a second, differential gloss application process for pixels belonging in the high coverage portion.

10. A method according to claim 9, wherein the first toner application process includes:

applying onto the associated uniform substrate a first layer of colored toner for rendering a desired image using the primary image data; and applying onto the associated uniform substrate a second layer of clear toner superimposed over the first layer for rendering a perceived texture.

11. A method according to claim 10 further comprising:

applying the clear toner in a first amount to the raised portion; and, applying the clear toner in a second amount different from the first amount to the recessed portion.

12. A method according to claim 9, wherein the second toner application process includes:

applying onto the associated uniform substrate a first layer of colored toner at a first halftone orientation for rendering the raised portion; and, applying onto the associated uniform substrate a second layer of the colored toner at a second halftone orientation different from the first halftone orientation for rendering the recessed portion.

13. A method according to claim 9 further comprising:

comparing a toner coverage value for each image pixel of the primary image data to a threshold; and, identifying the each image pixel as having a low toner coverage if the toner coverage value is less than the threshold and a high toner coverage if the toner coverage value is greater than the threshold.

14. A method according to claim 13, wherein the threshold is based on a degree of a differential gloss effect provided by different halftone structure orientations at a desired viewing angle relative to the associated uniform substrate.

15. A method according to claim 13, wherein the threshold is based on a luminance value of an input color in the primary image data.

16. A method according to claim 15, wherein the threshold is based on a luminance value of an input color in the textured image data.

17. A method according to claim 9 further comprising:

comparing a value representing each image pixel value of the textured image data to a threshold; and, identifying the each image pixel as being the raised portion if the image pixel value is greater than the threshold and the recessed portion if the image pixel value is less than the threshold.

18. A computer product comprising a non-transitory tangible medium encoding instructions which, when executed, perform the method of claim 9.

19. A system for providing a perceived texture on a uniform substrate, the system comprising:

a textured image source adapted to provide textured image data for describing a three-dimensional textured substrate as a two-dimensional textured image representing texture in the textured substrate;

a primary image source adapted to provide a primary image data;

a processor adapted to:

divide pixels of the primary image data into groups having low toner coverage and high toner coverage using the primary image data, and extract brightness values for each pixel of the textured image, the brightness values corresponding to a degree of dimension in the texture in the textured substrate;

divide pixels of the textured image data into a groups corresponding to a raised texture portion and a recessed texture portion based on the brightness values, concatenate the textured image data and the primary image data for generating a print instruction; and, an image forming apparatus adapted to use the print instruction for rendering a perceived texture on a substrate by applying colored toner for pixels corresponding to the low toner coverage portion, superimposing clear toner over the colored toner only for pixels corresponding to the raised texture portion in the low coverage portion, applying colored toner at a first anisotropic orientation only for the pixels corresponding to the raised texture portion in the high coverage portion, and applying the colored toner at a different anisotropic orientation only for the pixels corresponding to the recessed texture portion in the high coverage portion.

* * * * *